3,195,977
RECOVERY OF PLUTONIUM AND/OR URANIUM VALUES FROM AQUEOUS SOLUTIONS
Arthur R. Matheson, Ballston Lake, N.Y., assignor to the United States of America as represented by the United States Atomic Energy Commission
No Drawing. Filed Aug. 14, 1952, Ser. No. 304,448
7 Claims. (Cl. 23—14.5)

This invention deals with the recovery of uranium and/or plutonium values from aqueous solutions. The invention is particularly valuable in the recovery of uranium and plutonium values from aqueous waste solutions that remain after processing of uranium- and plutonium-containing aqueous solutions by extraction with organic water-immiscible solvents.

One specific instance in which waste solutions described above are obtained is in the processing of thermal neutron-irradiated uranium for the recovery of the uranium and/or plutonium. According to one of the processes in use for this purpose, the thermal neutron-irradiated uranium is dissolved in nitric acid, and the plutonium is oxidized to the hexavalent state in the nitric acid solutions obtained; the uranium and plutonium are then simultaneously extracted with an organic water-immiscible solvent. The uranium- and plutonium-depleted aqueous solution left after the solvent extraction step is a so-called waste solution. The uranium in the organic solvent containing the uranium and plutonium values is then selectively "back extracted" by contacting the organic solution with an aqueous solution of a reducing agent whereby the plutonium is converted to its tetravalent state which favors an aqueous medium. Thus, the plutonium is taken up by the aqueous reducing agent-containing solution, while the uranium preferentially remains in the solvent phase. Both, the aqueous plutonium solution and the organic uranium solution, are then further decontaminated from small quantities of uranium and plutonium, respectively, by one or several repetitions of extraction into a solvent and back extraction (for plutonium) or of back extraction into an aqueous solution and extraction into a solvent (for uranium). In each cycle of extraction plus back extraction aqueous "waste solutions" are finally obtained.

Very often these waste solutions still contain unduly high amounts of uranium and/or plutonium values, and in those cases it is desirable to subject the waste solutions to further processing in an endeavor also to recover these residual uranium and plutonium values and thereby to reduce the all-over uranium and plutonium losses of the process. It is advantageous to pool the waste solutions of the various phases of the recovery process for this further treatment. Such a combined mixture of waste solutions usually contains, in addition to uranyl nitrate and plutonium nitrate, aluminum nitrate, free nitric acid, sodium dichromate and chromium (III) nitrate, ferric nitrate and ferric ammonium sulfate.

It has been found that the uranium as well as the plutonium contained in such waste solutions or other similarly composed solutions can be recovered by mixing the solutions with an aqueous alkali metal hydroxide solution, e.g. aqueous sodium hydroxide. The aluminum nitrate is converted thereby to and precipitated as aluminum hydroxide which, however, is dissolved again as sodium aluminate with an excess of alkali metal hydroxide. The nitric acid is neutralized by the alkali metal hydroxide, and the chromium nitrate and alkali metal dichromate are converted to soluble, perhaps colloidal species of, chromium oxides or hydroxides and chromates, respectively. The ferric ions present are precipitated in the form of ferric hydroxide. The uranyl nitrate reacts with the alkali metal hydroxide to form highly insoluble uranates, such as the diuranate $$Na_2U_2O_7 \cdot 6H_2O$$

and/or polyuranates.

It was also found that the uranate precipitate formed carries an essential amount of the plutonium present in the solution and that the plutonium is almost quantitatively carried if it is present in the solution in its hexavalent form.

It was furthermore discovered that the presence of trivalent chromium ions interferes with the precipitation of plutonium on any of the above-mentioned uranate carriers.

It is an object of this invention to provide a process for the practically quantitative recovery of plutonium values from aqueous, trivalent chromium ions-containing solutions.

It is another object of this invention to provide a process for the practically quantitative recovery of plutonium values from solutions containing plutonium in very low absolute and relative concentrations.

It is still another object of this invention to provide a process for the simultaneous recovery of small quantities of uranium and plutonium values from relatively large volumes of aqueous solutions.

It is finally also an object of this invention to provide a process for the quantitative recovery of uranium values from aqueous solutions.

Aqueous solutions which contain plutonium values to be recovered and also uranyl ions, according to this invention, are brought together with an aqueous solution of alkali metal hydroxide, for instance sodium hydroxide, whereby the uranyl ion precipitates and the plutonium values are carried on the precipitate formed. This invention furthermore comprises an embodiment wherein an oxidizing agent is first added to a plutonium and chromium (III)-containing aqueous solution whereby both the plutonium and the chromium are oxidized to and/or maintained in the hexavalent state, the presence of uranyl ions is then secured, and thereafter the solution is admixed with an aqueous solution of alkali metal hydroxide whereby a precipitate forms of uranate which carries the plutonium values. Another phase of the invention comprises the recovery of uranium values from aqueous solutions by adding an oxidizing agent to the solutions and admixing the solutions with aqueous alkali metal hydroxide whereby the uranium is quantitatively precipitated.

The composition of a typical combined waste solution obtained as described above is given in the following Table I.

TABLE I

| Substance | Kg./22,000 liters | M Concentration |
|---|---|---|
| $Al(NO_3)_3 \cdot 9H_2O$ | 8,700 | 1.05 |
| $HNO_3$ | 339 | 0.24 |
| $NaNO_3$ | 371 | 0.23 |
| $Cr(NO_3)_3 \cdot 9H_2O$ | 313 | 0.035 |
| $Fe(NO_3)_3 \cdot 9H_2O$ | 155 | 0.017 |
| $NH_4HSO_4$ | 85 | 0.035 |
| $UO_2(NO_3)_2 \cdot 6H_2O$ (which represents a loss of 0.6%) | 19 | 0.0017 |
| $Pu(NO_3)_4$ (0.8% loss) | $2.4 \times 10^{-3}$ | $4.5 \times 10^{-7}$ |

The concentration of the alkali metal hydroxide solution to be used for precipitation may vary widely. A 50% solution of sodium hydroxide, for instance, has been found very satisfactory. In order to accomplish dissolution of the aluminum present in the solution, an excess of the alkali metal hydroxide is necessary. Equal volumes of a 50% sodium hydroxide solution and of a normal pooled waste solution, which contains uranyl nitrate hexahydrate in a concentration of $1.7 \times 10^{-2}$ M and thus in a concentration ten times as high as that of the normal waste solutions as specified above, have given good results.

When the alkali metal hydroxide solution is added to an aluminum- and uranyl-ions-containing waste solution, precipitation starts at a pH value of about 2. Aluminum precipitation is complete at a pH value of between 6 and 7. Further addition of alkali metal hydroxide solution then converts the aluminum hydroxide to alkali metal aluminate which is soluble. However, in order to warrant dissolution of the aluminum hydroxide, the latter has to be relatively fresh. Aluminum hydroxide, when aged, dissolves slowly and incompletely. Aging of the aluminum hydroxide is brought about if the addition of the sodium hydroxide is carried out too slowly, or if the aluminum hydroxide is allowed to age for several hours before the excess of alkali metal hydroxide necessary for dissolution is added, or if the temperature rises above about 50° C. during neutralization. It was found that all these factors, which cause aging of the aluminum hydroxide, are eliminated or avoided by carrying out precipitation with a so-called reverse strike, which means by adding the waste solution to the caustic solution rather than by adding the caustic to the waste solution.

After mixing of the waste solution with the alkali metal hydroxide solution, the mixture is allowed to digest for about 15 to 30 minutes; agitation during this digestion period was found helpful. The precipitate may then be separated from the solution for further processing by decantation, filtration, centrifugation, or any other means known to those skilled in the art.

Among the many oxidizing agents usable for the purpose of this invention, ammonium persulfate, a mixture of dichromate and ammonium persulfate, ammonium persulfate in the presence of silver ion catalyst, and ozone in the presence of a silver ion catalyst have been found particularly well suited.

In the following, two examples are given for the purpose of illustrating the efficiency of the process of this invention without the intention to limit the invention to details given therein.

*Example I*

A simulated pooled waste solution was prepared by mixing the ingredients listed above in Table I and in the quantities given there for a typical combined waste solution with the exception that higher plutonium and uranium contents were chosen. The uranium content was $1.7 \times 10^{-2}$ in all instances, which corresponds to an all-over loss of about 6% uranium. The same percentage of loss was also used for the plutonium content in most tests, which means that for a loss of 6% the plutonium content of the pooled solution was $3.4 \times 10^6$ M plutonium. However, in two experiments the plutonium content was increased so as to correspond to a loss of 15%, and in one experiment the concentration even represented a loss of 100%. In all instances precipitation was carried out by adding 10 ml. of the synthetic waste solution, after addition of the oxidizing agent—if any—thereto, to a 50% solution of sodium hydroxide. The results of these experiments are compiled in Table II.

TABLE II

| Exp't No. | Plutonium Content Corresponding to— | | Pretreatment | 50 percent NaOH (ml.) | Precipitation Conditions | Percent Plutonium Ascertained in— | | |
|---|---|---|---|---|---|---|---|---|
| | Percent Loss | Oxidation State | | | | Precipitate | Supernatant | Total |
| 1 | 6 | IV | None | 7 | Stirred ½ hr. Centrifuged 1 hr. | 65.2 | 36.7 | 101.9 |
| 2 | 6 | IV | do | 10 | Same as (1) | 70.1 | 17.2 | 87.3 |
| 3 | 6 | IV | do | 10 | 0.7 g. $(NH_4)_2S_2O_8$ added to mixed solutions. Centrifuged 2½ hrs. | 76.4 | 25.6 | 102.0 |
| 4 | 6 | IV | 0.05 M $Cr_2O_7^=$ at 80° C. for 10 min., 0.5 g. $(NH_4)_2S_2O_8$. | 10 | Stirred ½ hr. at 90° C. Centrifuged 2½ hrs. | 79.4 | 15.4 | 94.8 |
| 5 | 6 | IV | 0.5 g. $(NH_4)_2S_2O_8$ and 0.05 M $Ag^+$ at 80° C. for 10 min. | 10 | Stirred ½ hr. Centrifuged 3 hrs. | 94.5 | 5.3 | 99.8 |
| 6 | 15 | IV | Same as (5) | 10 | Stirred ½ hr. Centrifuged 2 hrs. | 90.0 | 4.2 | 95.1 |
| 7 | 100 | IV | 0.4 g. $(NH_4)_2S_2O_8$ and 0.05 M $Ag^+$ at 80° C. for 10 min. | 5 | Stirred 15 min | 94.9 | 0.9 | 95.8 |
| 8 | 7 | VI | Same as (7) | 5 | Same as (7) | 94.9 | 4.3 | 99.5 |
| 9 | 6 | IV | Ca. 2% ozone and 0.05 M $Ag^+$ at 80° C. for 6 hrs. | 10 | Stirred ½ hr. Centrifuged 3 hrs. | 95.1 | 3.9 | 99.0 |
| 10 | 15 | IV | Same as (9) | 10 | Same as (9) | 97.9 | 0.8 | 98.7 |

It is obvious from these tests that the plutonium recovery is considerably improved by the addition of an oxidizing agent. In Experiment 4 the improvement was not as good as in the other experiments using an oxidizing agent which probably was due to the use of too high a temperature. Experiment 3 shows that it is necessary to add the oxidizing agent prior to precipitation in order to obtain the best possible results.

*Example II*

In order to ascertain the behavior of uranium, and in particular the effect of the oxidizing agents on the uranium recovery, similar experiments were run with a simulated pooled waste solution which did not contain any plutonium, but which otherwise had the identical composition as the solution used in Example I. Details of these experiments and the results are summarized in Table III.

TABLE III

| Exp't No. | Pretreatment | 50% NaOH (ml.) | Precipitation Conditions | Percent Uranium in Supernatant |
|---|---|---|---|---|
| 1 | None | 6 | 0.2 g. $(NH_4)_2S_2O_8$ added to mixed solutions. Stirred ½ hr. Centrifuged 1 hr. | 4.7. |
| 2 | 0.5 g. $(NA_4)_2S_2O_8$ at 80° C. for 10 min. | 10 | Stirred ½ hr. Centrifuged 2½ hrs. | Trace. |
| 3 | 0.5 g. $(NH_4)_2S_2O_8$ and 0.05 M $Ag^+$ at 80° C. for 10 min. | 10 | Stirred ½ hr. Centrifuged 2 hrs. | Do. |
| 4 | Ca. 2% ozone and 0.05 M $Ag^+$ at 80° C. for 6 hrs. | 10 | Stirred ½ hr. Centrifuged 3 hrs. | Do. |

These experiments illustrate that the use of an oxidizing agent is also favorable for the uranium precipitation, since in all the experiments where an oxidizing agent was used, traces of uranium only were left in the supernatant while in the solution which had not been pretreated with an oxidizing agent the supernatant contained 4.7% of the uranium present in the simulated waste solution.

It will be understood that the invention is not only applicable to solutions obtained from neutron-irradiated uranium but that it may also be applied to solutions derived from other sources but similarly composed and containing plutonium and/or uranium. For instance, the invention lends itself very well to the recovery of uranium from ore solutions which have a relatively low uranium content.

It will also be understood that this invention is not to be limited to the details given herein but that it may be modified within the scope of the appended claims.

What is claimed is:

1. A process of recovering plutonium values from an aqueous chromium (III) and aluminum ions-containing solution, comprising adding an oxidizing agent to said solution whereby the plutonium and chromium are secured in their hexavalent state; incorporating said solution into an aqueous alkali metal hydroxide solution in the presence of a uranyl salt whereby a precipitate of alkali metal uranate is formed and said plutonium values are carried on said precipitate; and separating said precipitate from the aqueous solution.

2. The process of claim 1 wherein the oxidizing agent is ammonium persulfate.

3. The process of claim 1 wherein the oxidizing agent contains dichromate and persulfate anions.

4. The process of claim 1 wherein the oxidizing agent comprises persulfate anions and a silver cation-containing catalyst.

5. The process of claim 1 wherein the oxidizing agent comprises ozone and a silver cation-containing catalyst.

6. The process of claim 1 wherein precipitation is carried out at a temperature of the solutions below 50° C.

7. The process of claim 6 wherein precipitation is carried out at room temperature.

References Cited by the Examiner

Freundlich: Colloid and Capillary Chemistry, translated by Hatfield, page 220 (1922). Published by E. P. Dutton, New York.

Friend: Textbook of Inorganic Chemistry, vol. VII; part III, pages 302–303, 309, and 310–311 (1926). Published by Charles Griffin and Co., London. Copy in Patent Office Scientific Library.

Harvey: Nucleonics, vol. 2, No. 4, page 38 (April 1948).

CARL D. QUARFORTH, *Primary Examiner.*

NORMAN H. EVANS, WILLIAM G. WILES,
*Examiners.*